(12) United States Patent
Froebel et al.

(10) Patent No.: US 10,208,765 B2
(45) Date of Patent: Feb. 19, 2019

(54) GAS TURBINE AXIAL COMPRESSOR

(71) Applicant: MTU Aero Engines AG, Munich (DE)

(72) Inventors: Tobias Froebel, Siegertsbrunn (DE); Sebastian Mann, Munich (DE); Nina Wolfrum, Feldkirchen (DE); Sergio Elorza Gomez, Munich (DE)

(73) Assignee: MTU Aero Engines AG, Munich (DE)

( * ) Notice: Subject to any disclaimer, the term of this patent is extended or adjusted under 35 U.S.C. 154(b) by 496 days.

(21) Appl. No.: 15/000,224

(22) Filed: Jan. 19, 2016

(65) Prior Publication Data

US 2016/0215788 A1    Jul. 28, 2016

(30) Foreign Application Priority Data

Jan. 28, 2015 (EP) .................................... 15152865
Aug. 20, 2015 (EP) .................................... 15181650

(51) Int. Cl.

| F04D 29/32 | (2006.01) |
|---|---|
| F01D 9/04 | (2006.01) |
| F01D 5/14 | (2006.01) |
| F04D 29/54 | (2006.01) |
| F01D 9/06 | (2006.01) |
| F01D 19/02 | (2006.01) |

(52) U.S. Cl.
CPC .......... *F04D 29/324* (2013.01); *F01D 5/141* (2013.01); *F01D 5/145* (2013.01); *F01D 9/041* (2013.01); *F04D 29/544* (2013.01); *F05D 2220/323* (2013.01); *F05D 2240/303* (2013.01); *F05D 2240/304* (2013.01); *F05D 2250/70* (2013.01); *F05D 2250/711* (2013.01); *F05D 2250/712* (2013.01); *Y02T 50/673* (2013.01)

(58) Field of Classification Search
CPC ........ F04D 29/324; F04D 29/544; F01D 5/14; F01D 5/141; F01D 5/145; F01D 9/041; F05D 2220/323; F05D 2240/30; F05D 2240/301; F05D 2240/303; F05D 2240/304; F05D 2250/70; F05D 2250/71; F05D 2250/711; F05D 2250/712
See application file for complete search history.

(56) References Cited

U.S. PATENT DOCUMENTS

| 8,360,731 | B2 | 1/2013 | Nash et al. |
| 8,523,531 | B2 | 9/2013 | Micheli et al. |
| 8,678,757 | B2 | 3/2014 | Li |
| 8,702,398 | B2 | 4/2014 | Breeze-Stringfellow et al. |
| 8,708,660 | B2 | 4/2014 | Micheli et al. |

(Continued)

FOREIGN PATENT DOCUMENTS

| DE | 2144600 A1 | 3/1973 |
| DE | 102010014556 A1 | 10/2011 |

(Continued)

*Primary Examiner* — Justin Seabe
*Assistant Examiner* — Alexander White
(74) *Attorney, Agent, or Firm* — Barlow, Josephs & Holmes, Ltd.

(57) ABSTRACT

The present invention relates to an axial compressor for a gas turbine, in particular an aircraft engine, having at least one rotor blade or guide vane having a blade or vane element, which is arranged in a flow duct, and a leading edge and a trailing edge, which are joined to each other through a pressure side and a suction side, wherein, a new and novel profile section of the blade or vane element is provided.

6 Claims, 1 Drawing Sheet

(56) References Cited

U.S. PATENT DOCUMENTS

Figure 1:
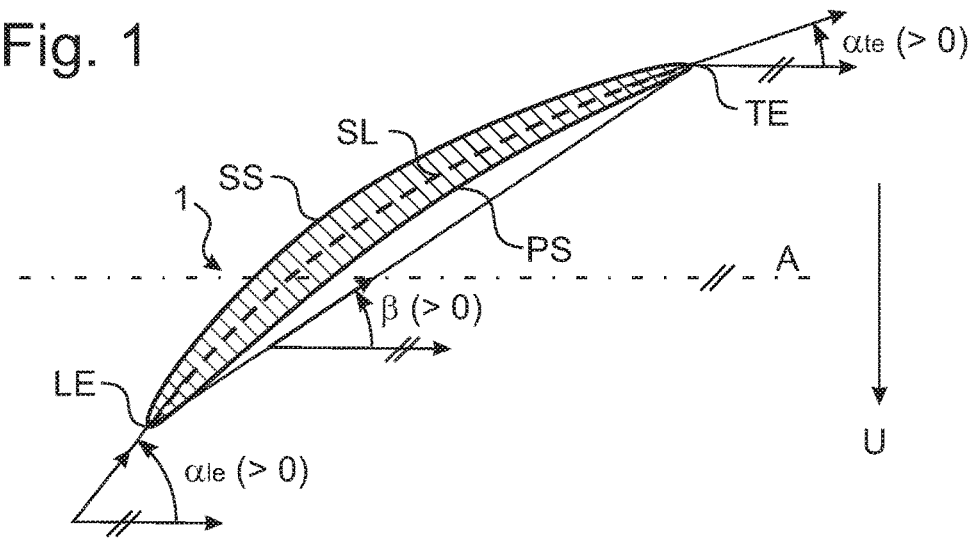

| | | |
|---|---|---|
| 2005/0031454 A1 | 2/2005 | Doloresco et al. |
| 2006/0222488 A1 | 10/2006 | Fessou et al. |
| 2008/0025840 A1* | 1/2008 | Guemmer ............... F01D 5/141 416/183 |
| 2008/0131272 A1 | 6/2008 | Wood et al. |
| 2011/0286856 A1* | 11/2011 | Micheli ................... F01D 5/141 416/241 R |
| 2013/0028749 A1* | 1/2013 | Elorza Gomez ........ F01D 5/141 416/243 |

FOREIGN PATENT DOCUMENTS

| | | |
|---|---|---|
| EP | 0441097 A1 | 8/1991 |
| EP | 0833060 B1 | 4/1998 |
| EP | 1760321 A2 | 3/2007 |
| EP | 1798377 A2 | 6/2007 |
| EP | 2623793 A1 | 8/2013 |
| GB | 2407136 A | 4/2005 |
| JP | 2001193692 A | 7/2001 |
| JP | 2007-231946 A | 9/2007 |

\* cited by examiner

GAS TURBINE AXIAL COMPRESSOR

The studies that have led to this invention were supported according to the Financial Aid Agreement No. 283216 (LEMCOTEC) as part of the European Union's Seventh Framework Program (FP7/2007-2013).

BACKGROUND OF THE INVENTION

The present invention relates to an axial compressor for a gas turbine, a gas turbine having the axial compressor, and an aircraft engine having the gas turbine.

Rotor blades and guide vanes of gas turbine axial compressors have a blade or vane element arranged in a flow duct of the axial compressor for redirecting the flow, said blade or vane element having a leading edge and a trailing edge, which are joined to each other through a pressure side and a suction side.

Between a tip of a blade or vane and the duct wall of the flow duct that lies radially opposite to it, a (radial) gap is normally present owing to relative rotation and, as a result of it, any flow redirected by the blade or vane is disrupted in a detrimental way.

This gap can vary. In particular, it can increase in size over the operating time of the axial compressor or—on account of the reduced centrifugal force—at lower speeds of rotation.

This increase in the gap detrimentally enhances the disruption induced by the gap and thereby deteriorates the (aerodynamic) performance of the blade or vane and hence of the axial compressor, in particular the efficiency of the blade or vane or the efficiency of the axial compressor, and/or its surge margin or its (pumping) stability. A deteriorated surge margin needs to be dealt with in the design and leads, in turn, to a (further) deterioration in the efficiency.

It is therefore desirable to reduce the deterioration in the performance and/or (pumping) stability in the case of gaps that are larger or are becoming larger and to reduce the gap sensitivity.

SUMMARY OF THE INVENTION

An object of an embodiment of the present invention is to improve a gas turbine.

This object is achieved by an axial compressor of the present invention. Also disclosed is a gas turbine having the axial compressor described here and an aircraft engine having such a gas turbine. Advantageous embodiments of the invention are discussed in further detail below.

According to an embodiment of the present invention, one or a plurality of blades or vanes, in particular one or a plurality of rotor blades, which can rotate with a rotor of the axial compressor or can be fastened to a rotor of the axial compressor and particularly are fastened and, in particular, integrally constructed with the rotor and which belong to at least one rotor cascade, in particular to a rotor cascade arranged furthest upstream, furthest downstream, and/or at least between the furthest upstream and furthest downstream rotor cascade, and/or one or a plurality of casing-fixed guide vanes of at least one vane cascade, in particular a guide vane cascade arranged furthest upstream, furthest downstream, and/or at least between the furthest upstream and furthest downstream guide vane cascade, of at least one axial compressor for a gas turbine, in particular, a gas turbine of an aircraft engine, in particular, a furthest upstream compressor or compressor nearest to the gas turbine inlet or low-pressure compressor, a furthest downstream compressor or compressor nearest to the gas turbine combustion chamber or high-pressure compressor, and/or a compressor arranged between the low-pressure compressor and high-pressure compressor or medium-pressure compressor, in particular one or a plurality of rotor blades, which can rotate with a rotor of the axial compressor or can be fastened to a rotor of an axial compressor and particularly are fastened and, in particular, integrally constructed with the rotor and which belong to at least one rotor cascade, in particular to a rotor cascade arranged furthest upstream, furthest downstream, and/or at least between the furthest upstream and furthest downstream rotor cascade, and/or one or a plurality of casing-fixed guide vanes of at least one vane cascade, in particular a guide vane cascade arranged furthest upstream, furthest downstream, and/or at least between the furthest upstream and furthest downstream guide vane cascade, of at least one axial compressor for a gas turbine, in particular, a gas turbine of an aircraft engine, in particular, a furthest upstream compressor or compressor nearest to the gas turbine inlet or low-pressure compressor, a furthest downstream compressor or compressor nearest to the gas turbine combustion chamber or high-pressure compressor, and/or a compressor arranged between the low-pressure compressor and high-pressure compressor or medium-pressure compressor, a blade or vane element for redirecting the flow, respectively arranged in a flow duct, said blade or vane element having a leading edge and a trailing edge, which are joined to each other through a pressure side and a suction side, wherein in each profile section of the blade or vane element (at least) in a range between (at most) 5%, in particular 0%, and (at least) 95%, in particular 100%, of a radial blade or vane height from a blade or vane element root to a blade or vane (element) tip:

- the profile center line or skeletal line has at most two points of inflection, in particular at most one point of inflection, in particular no point of inflection;
- the metal angle at the leading edge $\alpha_{le}$ lies in a range between (+) 20° and (+) 75°;
- the metal angle at the trailing edge $\alpha_{te}$ lies in a range between −20° and (+) 70° and is at most the same as and, in particular, smaller than the metal angle at the leading edge $\alpha_{le}$;
- the stacking angle β lies in a range between 0° and (+) 70°, in particular between (+) 10° and (+) 70°;

and wherein
an absolute, in particular the single local, minimum $\lambda_{min}$ of a front load angle λ, which is identical to the difference between the arithmetic mean $$\frac{\alpha_{le} + \alpha_{te}}{2}$$

of the metal angle at the leading edge and trailing edge $\alpha_{le}$, $\alpha_{te}$ as minuend and the stacking angle β as subtrahend or is identical to $$\frac{\alpha_{le} + \alpha_{te}}{2} - \beta,$$

in a range between (at least) 55%, in particular 60%, and (at most) 85%, in particular 80%, of the radial blade or vane element height; and
a local or absolute maximum $\lambda_{max}$ of the front load angle lies in a range between 95% and 100% of the radial or vane body height, in particular at a blade or vane tip or at 100% of the radial blade or vane element height.

In one embodiment, the blade or vane element is defined or formed in a technically conventional manner, in particular by blade or vane element profile sections or profile sections or profiles of the blade or vane element that are arranged one on top of the other along a thread axis, in particular one that is curved or straight and in alignment with the radial direction of the compressor or inclined at an angle to the radial direction of the compressor.

In one embodiment, a (blade or vane element) profile section or profile in terms of the present invention is accordingly, in a technically conventional manner, a section of a cylindrical surface area that is concentric with the axis of rotation of the compressor or a conical surface area that is interpolated between the end faces on the hub side and casing side with the blade or vane element or a planar extension or projection thereof.

In one embodiment, the leading edge is the line connecting the axially frontmost or furthest upstream point of the blade or vane element profile sections arranged one on top of the other along the thread axis and/or the axially frontmost or furthest upstream section point or connecting point of the pressure side and suction side of the blade or vane element.

In one embodiment, the trailing edge is the line connecting the axial rearmost or furthest downstream point of the blade or vane element profile sections arranged one on top of the other along the thread axis and/or the axially rearmost or furthest downstream section point or connecting point of the pressure side and suction side of the blade or vane element.

The blade or vane element has a maximum radial extension or radial blade or vane element height H from a blade or vane element root to a blade or vane tip. The blade or vane element height is thus directed from the blade or vane element root to the blade or vane tip, so that, for example, 25% of the radial blade or vane element height is closer to the blade or vane element root than 50% of the radial blade or vane element height and 75% of the radial blade or vane element height is closer to the blade tip than 50% of the blade or vane element height.

In one embodiment, the blade or vane is a blade or vane without an (outer) shroud. In one embodiment, the blade or vane element tip is the blade or vane tip.

If the blade or vane is a rotor blade, then the blade element has a radial blade element height H from a blade element root on the rotor or hub side, in particular a blade element profile section that is nearest to the rotor or hub or radially innermost, up to a radially outer blade tip, in particular a radially outermost blade element profile section, so that a radially innermost blade element profile section lies in the radial direction at 0% of the radial blade element height H or 0·H or the blade element begins, and a radially outermost blade element profile section or the blade tip lies at 100% of the radial blade element height H or 1·H or the blade element ends.

If the blade or vane is a guide vane, then the vane element has a radial vane element height H from a vane element root on the casing side, in particular a vane element profile section that is nearest to the casing or radially outermost, up to a radially inner tip of the vane, in particular a radially innermost vane element profile section, so that a radially outermost vane element profile section in the radial direction lies at 0% of the radial vane element H or 0·H or the vane element begins, and a radially innermost vane element profile section or the tip of the vane lies at 100% of the radial vane element height H or 1·H or the vane element ends.

In one embodiment, the profile center line or skeletal line is, in a technically conventional manner, the line that passes between the pressure side and suction side of the respective blade or vane element profile section and is equally spaced between them. It correspondingly extends through the leading edge and the trailing edge.

In one embodiment, a point of inflection is, in technically conventional manner, a point (of the profile center line or skeletal line) at which a curvature of the profile center line or skeletal line changes its sign or a convexly curved portion of the profile center line or skeletal line becomes a concavely curved portion or a concavely curved portion of the profile center line or skeletal line becomes a convexly curved portion.

In one embodiment, in a technically conventional manner, the metal angle at the leading edge, $\alpha_{le}$, is the angle between a vector that is parallel to the axis of rotation of the compressor and is directed in the axial direction in the through-flow direction or in the direction from the leading edge to the trailing edge and a vector that is parallel to the tangent in the leading edge at the profile center line of the respective blade or vane element profile section and is directed in the axial direction in the through-flow direction or in the direction from the leading edge to the trailing edge, wherein the angle is defined or counted as being positive counter to the direction of the (regular) peripheral speed of the compressor for rotor blades and in the direction of the (regular) peripheral speed of the compressor for guide vanes. It is also referred to in the literature as the profile inlet angle.

In one embodiment, in a technically conventional manner, the metal angle at the trailing edge, $\alpha_{te}$, is the angle between a vector that is parallel to the axis of rotation of the compressor and is directed in the axial direction in the through-flow direction or in the direction from the leading edge to the trailing edge and a vector that is parallel to the tangent in the trailing edge at the profile skeletal line of the respective blade or vane element profile section and is directed in the axial direction in the through-flow direction or in the direction from the leading edge to the trailing edge, wherein the angle is defined as being positive counter to the direction of the (regular) peripheral speed of the compressor for rotor blades and in the direction of the (regular) peripheral speed of the compressor for guide vanes. It is referred to in the literature as the profile outlet angle.

In one embodiment, in a technically conventional manner, the stacking angle $\beta$ is the angle between a vector that is parallel to the axis of rotation of the compressor and is directed in the axial direction in the through-flow direction or in the direction from the leading edge to the trailing edge and a vector that is parallel to the connecting straight lines through the leading edge and the trailing edge in the respective blade or vane element profile section and is directed in the axial direction in the through-flow direction or in the direction from the leading edge to the trailing edge, wherein the angle is defined as being positive counter to the direction of the (regular) peripheral speed of the compressor for rotor blades and in the direction of the (regular) peripheral speed of the compressor for guide vanes.

Accordingly, for a rotor blade, the tangents in the leading edge at the profile skeletal line and the connecting straight lines through the leading edge and the trailing edge are each inclined at an angle counter to the peripheral speed direction or, for positive metal angle or stacking angle, extend out of the axis of rotation by rotation counter to the peripheral speed direction (from radially outward to inward and in the through-flow direction in the direction of view).

For a guide vane, on the contrary, the tangents in the leading edge at the profile skeletal line and the connecting straight lines through the leading edge and the trailing edge are each inclined at an angle in the direction of the peripheral speed direction of the compressor, or extend out of the axis of rotation by rotation in the peripheral speed direction of the compressor (from radially outward to inward and in the through-flow direction in the direction of view).

It has been found that an angle λ, which is defined as equal to the difference obtained from the arithmetic mean $$\frac{\alpha_{le} + \alpha_{te}}{2}$$

of the metal angles $\alpha_{le}$, $\alpha_{te}$ at the leading edge and trailing edge as minuend and the stacking angle β as subtrahend or according to $$\lambda = \frac{\alpha_{le} + \alpha_{te}}{2} - \beta$$

has an influence where the respective blade or vane element profile section is subjected to more load or acts on the flow redirected by it: higher values correspond to more front load distribution, lower values to a load distribution that is closer to the trailing edge. Therefore, it is referred to here as the front load angle λ.

Surprisingly, in the process, it has been found that, through requirement-specific localization of a local maximum or of the absolute maximum $\lambda_{max}$ of the front load angle λ in the vicinity of or at the blade or vane tip in combination with the requirement-specific localization of the absolute minimum $\lambda_{min}$ within the half of the blade or vane element height that is closer to the blade or vane tip below this maximum, a deterioration in the performance of the axial compressor, in particular the efficiency of the corresponding blade(s) or vane(s) and hence also of the axial compressor, and/or a deterioration in the surge margin of the axial compressor or its (pumping) stability or the gap sensitivity of the axial compressor are advantageously reduced for gaps that are larger or are becoming larger.

Correspondingly, it is possible through this combination, in particular in the case of gaps that are larger or are becoming larger, to achieve a better performance, in particular a better or higher efficiency and/or a better or greater surge margin. In this way, in one embodiment, greater high aspect ratios (HAR) can be achieved without or with only slight declines in (pumping) stability.

In this regard, it is assumed that the load distribution in this region, which is increased at the front by way of the requirement-specific localization of a local maximum or of the absolute minimum of the front load angle in the vicinity of the blade or vane tip, in combination with the load distribution that is brought about nearer to the trailing edge in this region by way of the requirement-specific localization of the absolute minimum of the front load angle, advantageously reduce the increase in disruption of the flow by the gap between the blade or vane tip and duct wall for gaps that are becoming larger.

Surprisingly, it has further been found that this positive effect is effective especially in blade or vane elements for which the metal angle and stacking angle lie—at least essentially—over their entire radial blade or vane element height in the requirement-specific ranges, and the profile skeletal lines of which each have at most two points of inflection there.

In the process, a requirement-specific design of one or a plurality of rotor blades and/or guide vanes of one or a plurality of stages of an axial compressor can advantageously reduce the deterioration in its performance and/or its surge margin for gaps that are larger or are becoming larger or its gap sensitivity, wherein, in particular, a requirement-specific design of all rotor blades and/or all guide vanes of one or a plurality of stages of the axial compressor can reduce especially advantageously any deterioration in its performance and/or its surge margin for gaps that are larger or are becoming larger or its gap sensitivity.

In an enhancement, the front load angle λ decreases monotonically, in particular strictly monotonically, in the radial direction in a range between (at least) 50%, in particular 40%, of the radial blade or vane element height H and the absolute minimum $\lambda_{min}$ of the front load angle λ.

In other words, in one embodiment, the following holds in the given range of the radial blade or vane element height: $x_2 > x_1 \Rightarrow \lambda(x_2) \leq \lambda(x_1)$ (monotonic) or $\lambda(x_2) < \lambda(x_1)$ (strictly monotonic), where x is the distance in the radial direction from the blade or vane element root.

Additionally or alternatively, in an enhancement, the front load angle increases monotonically, in particular strictly monotonically, in the radial direction starting from the absolute minimum of the front load angle up to a maximum nearest to the blade or vane tip, in particular the absolute maximum, of the front load angle. A (local or absolute) maximum nearest to the blade or vane tip can lie, in particular, also at or in the blade or vane tip.

In other words, in one embodiment, the following holds between the absolute minimum of the front load angle and the maximum, in particular the absolute maximum, of the front load angle that is nearest to the blade or vane tip: $x_2 > x_1 \Rightarrow \lambda(x_2) \geq \lambda(x_1)$ (monotonic) or $\lambda(x_2) > \lambda(x_1)$ (strictly monotonic), where x is once again the distance in the radial direction from the blade or vane element root.

In one embodiment, a maximum and, in particular, the absolute maximum $\lambda_{max}$ of the front load angle that is nearest to the blade or vane tip is greater than an arithmetic mean of the front load angle over a range from 0% to 40%, in particular 0% to 50%, of the radial blade or vane element height H. Once again, x refers to the radial distance to blade or vane element root, in other words, the following applies:

$$\lambda_{max} > \frac{1}{X_0}\int_0^{X_0} \lambda(x)dx;$$

$$X_0 = 0.4/0.5 \cdot H$$

Surprisingly, it has been found that such a (strictly) monotonic curve in the requirement-specific ranges as well as a requirement-specific ratio of the maximum, in particular the absolute maximum, nearest to the blade or vane tip to the arithmetic mean value in the requirement-specific range especially advantageously reduces any deterioration in the performance and/or surge margin of an axial compressor for gaps that are larger or are becoming larger or its gap sensitivity, each in itself but, in particular, in combination with one another.

BRIEF DESCRIPTION OF THE DRAWING FIGURES

Figure 2:
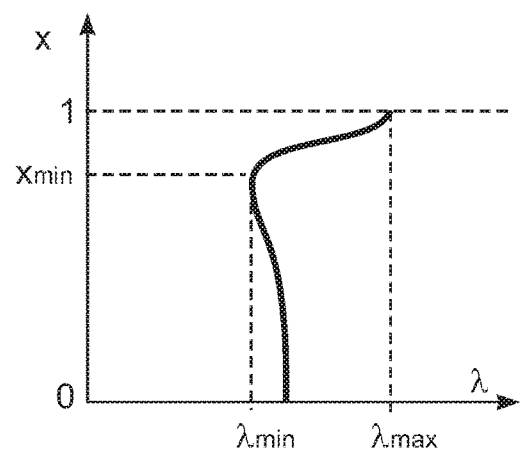
Figure 3:
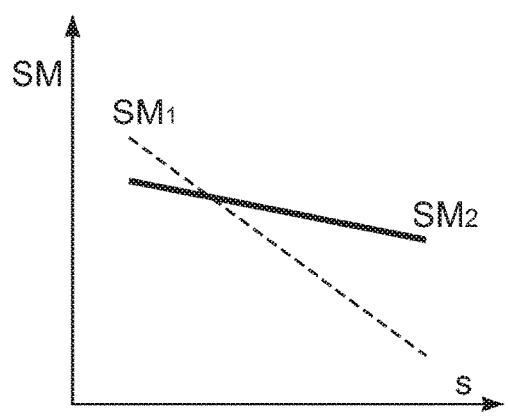

Further advantageous enhancements of the present invention ensue from the dependent claims and the following description of preferred exemplary embodiments. Shown for this purpose in partially schematic illustration is:

FIG. 1 a profile section of a blade element 1 of a blade of an axial compressor of a gas turbine of an aircraft engine according to an embodiment of the present invention;

FIG. 2 a curve of the front load angle $\lambda$ over the radial blade or vane element height; and FIG. 3 a surge margin over a gap height for an axial compressor according to the invention and for a conventional axial compressor.

DETAILED DESCRIPTION OF THE INVENTION

FIG. 1 shows a profile section of a blade element 1 of a rotor blade of an axial compressor of a gas turbine of an aircraft engine according to an embodiment of the present invention.

The blade element 1 has a leading edge LE and a trailing edge TE, which are joined together through a pressure side PS and a suction side SS.

Indicated in FIG. 1 are the metal angle at the leading edge $\alpha_{le}$, the metal angle at the trailing edge $\alpha_{te}$, the stacking angle $\beta$, the dot-dashed axis of rotation A of the axial compressor, and the dashed profile skeletal line SL.

As also in all other profile sections of the blade element 1 between a blade element root and a blade tip, the profile skeletal line SL has at most two points of inflection (no point of inflection in the profile section of FIG. 1), the metal angle at the leading edge $\alpha_{le}$ lies in a range between 20° and 75°, the at most equal metal angle at the trailing edge $\alpha_{te}$ lies in a range between −20° and 70°, and the stacking angle $\beta$ lies in a range between 0° and 70°.

In this case, the vector directed parallel to the tangent in the trailing edge at the profile skeletal line and in the axial direction in the through-flow direction would be oriented from top left to bottom right in FIG. 1 for a negative metal angle at the trailing edge of $\alpha_{te}<0$.

FIG. 2 shows a curve of the requirement-specific defined front load angle $\lambda$ over the radial blade or vane element height H, where x is the distance to the blade or vane element root in relation to the blade or vane element height. Accordingly, x=0 corresponds to a radial position at the height of the blade or vane element root, that is, radially entirely inward or at the beginning of the blade element in the case of a rotor blade, and x=1 corresponds to a radial position at the height of the blade or vane tip, that is, radially entirely outward or at the tip of the blade element in the case of a rotor blade.

It can be seen in FIG. 2 that the absolute minimum $\lambda_{min}$ of the front load angle lies in a range between 60% and 80% of the radial blade or vane element height ($\lambda(x_{min})=\lambda_{min}<\lambda(x)$ for all $x \neq x_{min}$, $x_{min} \in [0.6; 0.8]$).

It can further be seen in FIG. 2 that that absolute maximum $\lambda_{max}$ of the front load angle lies at the blade or vane tip ($\lambda(x=1)=\lambda_{max}>\lambda(x)$ for all x<1).

It can further be seen in FIG. 2 that the front load angle $\lambda$ decreases monotonically in the radial direction starting from the blade or vane element root up to the absolute minimum of the front load angle and, in the range between 50% of the radial blade or vane element height and the absolute minimum of the front load angle, even decreases strictly monotonically starting from the absolute minimum of the front load angle, and increases strictly monotonically starting from the absolute minimum $\lambda_{min}$ of the front load angle up to the blade or vane tip or up to the absolute maximum $\lambda_{max}$ nearest to the blade or vane tip.

The absolute maximum $\lambda_{max}$ of the front load angle is greater than the arithmetic mean value of the front load angle over a range of 0% to 50% of the radial blade or vane element height.

FIG. 3 shows, as a narrow and dashed line, the curve of a surge margin $SM_1$ of a conventional axial compressor and, as a bold and solid line, the curve of the surge margin $SM_2$ of an axial compressor according to an embodiment of the present invention, in each case over a radial gap height s of a radial gap of one of its blades or vanes.

It can be seen that the surge margin $SM_2$ of the axial compressor according to the invention is advantageously reduced to a lesser extent (in FIG. 3, drops) or deteriorates for gap heights that are becoming larger (to the right in FIG. 3) than in the case of conventional axial compressors. In this way, the axial compressor according to the invention can be designed in regard to the gap enlargement for a greater surge margin, and therefore, its efficiency can be improved. A picture that is qualitatively similar to FIG. 3 ensues also for the comparison of the efficiency of the respective blade or vane or of the compressor over the gap height.

In addition, it can be seen in FIG. 3 that the illustrated surge margin $SM_2$ of the axial compressor according to an embodiment of the present invention is less for small gap heights (left in FIG. 3) than for the conventional axial compressor. However, this can be taken into account when, in particular, actual gap heights lie in the region to the right of the point of intersection of the two curves $SM_1$, $SM_2$.

In order to clearly explain the definition of the metal angle and stacking angle used here in a conventional technical sense, the regular peripheral speed direction U of the compressor as a vertical arrow from top to bottom, vectors parallel to the axis of rotation A of the compressor and directed in the axial direction in the through-flow direction (from left to right in FIG. 1) or in the direction from the leading edge to the trailing edge, vectors parallel to the tangents in the leading edge and trailing edge at the profile skeletal line and directed in the axial direction also in the through-flow direction, a vector parallel to the connecting straight lines through the leading edge and the trailing edge and directed in the axial direction also in the flow direction, as well as angles $\alpha_{le}$, $\alpha_{te}$, and $\beta$, positively defined or counted counter to the direction of the peripheral speed of the compressor, are indicated.

It can be seen that the tangents in the leading edge and trailing edge at the profile skeletal line and the connecting straight line through the leading edge and trailing edge are each inclined at an angle counter to the peripheral speed direction or project out from the axis of rotation A by rotation counter to the peripheral speed direction (from radially outward to inward in the direction viewed and from left to right in FIG. 1 in the through-flow direction, that is, counterclockwise).

In addition, it can be seen that, in the reflection of FIG. 1 at the axis of rotation A, that is, for a compressor with counterclockwise regular peripheral speed direction, rotor blades having a positive stacking angle and metal angle at the leading edge $\alpha_{le}$ ensue in each case.

It can further be seen that, in the reflection of the profile section of FIG. 1 at the axis of rotation A, a guide vane having a positive stacking angle and a metal angle at the leading edge $\alpha_{le}$ for a constant regular peripheral speed direction ensue.

Although, in the preceding description, exemplary embodiments were explained, it is noted that a large number of modifications are possible. Moreover, it is noted that the exemplary embodiments are merely examples, which in no way are intended to limit the protective scope, the applications, and the construction. Instead, the preceding description provides the person skilled in the art with a guideline for implementing at least one exemplary embodiment, with it being possible to make diverse modifications, in particular in regard to the function and arrangement of the described components, without departing from the protective scope, as ensues from the claims and combinations of features equivalent to these.

What is claimed is:

1. An axial compressor for a gas turbine, in particular an aircraft engine, having at least one rotor blade or guide vane having a blade or vane element, which is arranged in the flow duct, and a leading edge and a trailing edge, which are joined to each other through a pressure side and a suction side, wherein,
   in each profile section of the blade or vane element in a range between 5% and 95% of a radial blade or vane element height from a blade or vane element root to a blade or vane tip,
   a profile skeletal line has at most two points of inflection;
   a metal angle at the leading edge lies in a range between 20° and 75°;
   a metal angle at the trailing edge lies in a range between −20° and 70° and is at most equal to the metal angle at the leading edge; and
   a stacking angle lies in a range between 0° and 70°;
   and wherein
   a local or absolute minimum of a front load angle, which is equal to the difference obtained from the arithmetic mean of the metal angles at the leading edge and trailing edge as minuend and the stacking angle as subtrahend $$\left( \lambda = \frac{\alpha_{le} + \alpha_{te}}{2} - \beta \right)$$

lies in a range between 55% and 85% of the radial blade or vane element height; and a local or absolute maximum of the front load angle lies in a range between 95% and 100% of the radial blade or vane element height at a blade or vane tip.

2. The axial compressor according to claim 1, wherein the front load angle decreases monotonically in the radial direction in a range between 50% of the radial blade or vane element height and the absolute minimum of the front load angle.

3. The axial compressor according to claim 1, wherein the front load angle increases strictly monotonically in the radial direction starting from the absolute minimum of the front load angle up to a maximum nearest to the blade or vane tip of the front load angle.

4. The axial compressor according to claim 1, wherein a maximum of the front load angle that is nearest to the blade or vane tip is greater than the arithmetic mean value of the front load angle over a range of 0% to 40% of the radial blade or vane element height.

5. The axial compressor according to claim 1, wherein the axial compressor is in a gas turbine where the axial compressor is a furthest upstream, furthest downstream, or in between, one-stage or multistage axial compressor.

6. The axial compressor according to claim 5, wherein the gas turbine is in an aircraft engine.

* * * * *